United States Patent [19]

Schank et al.

[11] Patent Number: 5,230,976
[45] Date of Patent: Jul. 27, 1993

[54] POLYMERIC ARYLAMINE SILANE COMPOUNDS AND IMAGING MEMBERS INCORPORATING SAME

[75] Inventors: Richard L. Schank, Pittsford; John Yanus, Webster, both of N.Y.

[73] Assignee: Xerox Corporation, Stamford, Conn.

[21] Appl. No.: 813,711

[22] Filed: Dec. 27, 1991

[51] Int. Cl.$^5$ .............................. G03G 5/047
[52] U.S. Cl. ...................... 430/59; 430/73; 430/80
[58] Field of Search ................ 430/59, 73, 80

[56] References Cited

U.S. PATENT DOCUMENTS

| | | |
|---|---|---|
| 3,899,328 | 8/1975 | Limburg ................ 430/80 X |
| 4,758,488 | 7/1988 | Johnson et al. ........... 430/59 |
| 4,801,517 | 1/1989 | Frechet et al. ........ 430/80 X |
| 4,806,444 | 2/1989 | Yanus et al. .......... 430/59 X |
| 4,818,650 | 4/1989 | Limburg et al. ....... 430/59 X |
| 4,959,288 | 9/1990 | Ong et al. ................ 430/59 |
| 5,030,532 | 7/1991 | Limburg et al. ....... 430/73 X |
| 5,116,708 | 5/1992 | Shikatani et al. .......... 430/59 |

FOREIGN PATENT DOCUMENTS 105954  4/1989  Japan ..................... 430/59

*Primary Examiner*—Roland Martin
*Attorney, Agent, or Firm*—Kenyon & Kenyon

[57] ABSTRACT

Electrophotographic imaging members are disclosed which incorporate a charge transport layer comprising an arylamine/siloxane polymer.

21 Claims, No Drawings

POLYMERIC ARYLAMINE SILANE COMPOUNDS AND IMAGING MEMBERS INCORPORATING SAME

BACKGROUND OF THE INVENTION

This invention relates to arylamine compounds, particularly to polymeric tertiary arylamine compounds and electrophotographic imaging members and processes utilizing such polymeric tertiary arylamine compounds.

In the art of electrophotography an electrophotographic plate comprising a photoconductive insulating layer on a conductive layer is imaged by first uniformly electrostatically charging the surface of the photoconductive insulating layer. The plate is then exposed to a pattern of activating electromagnetic radiation such as illuminated areas of the photoconductive insulating layer. The plate is then exposed to a light, which selectively dissipates the charge in the illuminated areas of the photoconductive insulating layer while leaving behind an electrostatic latent image in the non-illuminated areas. This electrostatic latent image may then be developed to form a visible image by depositing finely divided electroscopic toner particles on the surface of the photoconductive insulating layer. The resulting visible toner image can be transferred to a suitable receiving member such as paper. This imaging process may be repeated many times with reusable photoconductive insulating layers.

As more advanced, higher speed electrophotographic copiers, duplicators and printers were developed, degradation of image quality was encountered during cycling. Moreover, complex, highly sophisticated, duplicating and printing systems operating at high speeds have placed stringent requirements including narrow operating limits on photoreceptors. For example, the numerous layers found in many modern photoconductive imaging members must be highly flexible, adhere well to adjacent layers, and exhibit predictable electrical characteristics within narrow operating limits to provide excellent toner images over many thousands of cycles. There is also a great current need for long-lasting, flexible photoreceptors in compact imaging machines that employ small diameter support rollers for photoreceptor belt systems compressed into a very confined space. Small diameter support rollers are also highly desirable for simple, reliable copy paper stripping systems which utilize the beam strength of the copy paper to automatically remove copy paper sheets from the surface of a photoreceptor belt after toner image transfer. However, small diameter rollers, e.g. less than about 0.75 inch (19 mm) diameter, raise the threshold of mechanical of mechanical performance criteria for photoreceptors to such a high level that spontaneous photoreceptor belt material failure becomes a frequent event for flexible belt photoreceptors.

One type of multilayered photoreceptor that has been employed as a belt in electrophotographic imaging systems comprises a substrate, a conductive layer, a charge blocking layer, a charge generating layer, and a charge transport layer. The charge transport layer often comprises an activating small molecule dispersed or dissolved in a polymeric film forming binder. Generally, the polymeric film forming binder in the transport layer is electrically inactive by itself and becomes electrically active when it contains the activating small molecule. The expression "electrically active" means that the material is capable of supporting the injection of either the hole or electrophotogenerated charge carrier from the material in the charge generating layer and is capable of allowing the transport of these charge carriers through the electrically active layer in order to discharge a surface charge on the active layer. The multilayered type of photoreceptor may also comprise additional layers such as an anti-curl backing layer, an adhesive layer, and an overcoating layer.

DESCRIPTION OF PRIOR ART

U.S. Pat. No. 4,818,650 discloses an electrostatic imaging member comprising a polymeric amine compound. The patent does not describe polymeric amine compounds linked by siloxane linkages.

U.S. Pat. No. 4,725,518 discloses a charge transport layer comprising an aromatic amine compound. The patent does not describe polymeric amine compounds linked by siloxane linkages.

U.S. Pat. No. 4,806,444 discloses an electrostatic imaging member comprising a polymeric amine compound linked by an —O—CO—O— group. The patent does not describe polymeric amine compounds linked by siloxane linkages.

SUMMARY OF THE INVENTION

It is, therefore, an object of the present invention to provide an improved polymeric tertiary arylamine compound or a photoresponsive member containing the polymeric compound which overcome at least some of the above-noted disadvantages.

It is yet another object of the present invention to provide an improved electrophotographic member which exhibits greater resistance to cracking and crazing induced by repetitive mechanical flexing.

It is still another object of the present invention to provide a photoconductive imaging member which eliminates component crystallization.

It is a further object of the present invention to provide an electrophotographic imaging member which retains stable electrical properties during cycling.

It is yet another object of the present invention to provide an improved electrophotographic member which resists abrasion when exposed to blade cleaning devices.

It is a further object of the present invention to provide an improved photoconductive imaging member which exhibits resistance to residual toner build-up subsequent to mechanical cleaning.

Some of the foregoing objects and others are accomplished in accordance with the present invention by providing a polymeric arylamine siloxane compound represented by the formula:

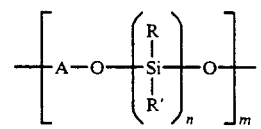

wherein A is a tertiary arylamine moiety, R is a substituted or unsubstituted alkyl, alkenyl or aryl group, R' is a substituted or unsubstituted alkyl, alkenyl or aryl group, m is an integer from about 5 to about 5,000, and n is an integer from 1 to 6 (preferably from 1 to 3). The tertiary arylamine moiety is derived from and is a residue of a precursor tertiary arylamine compound used in the reaction forming the polymer. Preferred compounds of the present invention are those of the formula:

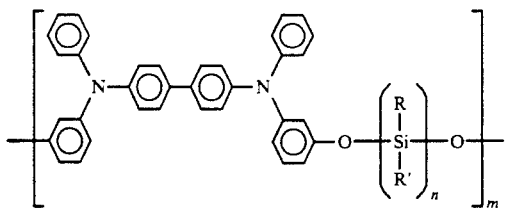

wherein R, R', m and n are as specified above. Other such compounds according to the present invention are of similar formula but with substitution on the tertiary arylamine moiety resulting from the use of an arylamine other than N,N'-diphenyl-N,N'-bis(3-hydroxyphenyl)-(1-1'-biphenyl)-4,4'-diamine to make such compounds.

Some of the foregoing objects and others are also accomplished in accordance with the present invention by providing a polymeric arylamine siloxane compound formed by the reaction of a tertiary aryl amine, such as N,N'-diphenyl-N,N'-bis(3-hydroxyphenyl)-(1-1'-biphenyl)-4,4'-diamine and the like, with a silane of the general formula:

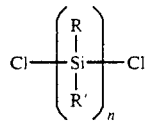

wherein R is a substituted or unsubstituted alkyl, alkenyl or aryl group, R' is a substituted or unsubstituted alkyl, alkenyl or aryl group, and n is an integer from 1 to 6 (preferably from 1 to 3). Mixtures of two or more silanes of this formula may also be reacted with the arylamine compound to form compounds of the present invention. The arylamine compound and silane can also be reacted in the presence of additional aromatic monomers, such as bisphenols and the like.

The polymeric arylamine siloxane of this invention is used in an electrophotographic imaging member comprising a substrate, a charge generating layer, and a hole transport layer where at least the charge generating layer or hole transport layer contains the polymeric arylamine siloxane described above.

A photoconductive imaging member of this invention may be prepared by providing a substrate having an electrically conductive surface, applying a charge generation layer on the substrate, and applying a charge transport layer on the charge generating level. Suitable substrates and charge generation layers are known to those skilled in the art. Detailed examples of suitable substrates and charge generation layers are disclosed in U.S. Pat. No. 4,818,650, the entire disclosure of this patent being incorporated herein by reference. A charge blocking layer may also be used between the substrate and the charge generating layer. Detailed examples of suitable blocking layers are disclosed in U.S. Pat. No. 4,818,650, the entire disclosure of this patent being incorporated herein by reference.

The thickness of the substrate layer and blocking layer will depend on numerous factors including economical ones. Those skilled in the art will know acceptable ranges for the thickness of the layers. More detailed examples of the desired thickness of the substrate layer are also disclosed in U.S. Pat. No. 4,818,650, the entire disclosure of this patent being incorporated herein by reference. More detailed examples of the desired thickness of the blocking layer are also disclosed in U.S. Pat. No. 4,818,650, 4,291,110, 4,338,387, 4,286,033, the entire disclosure of each patent being incorporated herein by reference.

Any suitable photogenerating layer may be applied to the blocking layer, which can then be overcoated with the charge transport layer. Those skilled in the art may overcoat the layer as detailed in U.S. Pat. No. 4,818,650. Examples of photogenerating layers include inorganic photoconductive particles such as amorphous selenium, trigonal selenium, and selenium alloys as described in U.S. Pat. No. 4,818,650.

The photogenerating composition or pigment may be employed in an inactive or active binder resin. Typical inactive binder resins include polycarbonates, polyesters, polyurethanes, polystyrenes, polysulfones, polyamides, polyethersulfones, polyethylenes, polypropylenes, polybutadienes, polyarylsulfones, polyarylethers, polyphenylene sulfides and others described in U.S. Pat. No. 3,121,006, the entire disclosure of which is incorporated by reference herein. The most common active transport resin is polyvinylcarbazole.

The photogenerating composition or pigment may be present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

For embodiments in which the photogenerating layers do not contain a resinous binder, the photogenerating layer may comprise any suitable, well known homogeneous photogenerating material. Typical homogeneous photogenerating materials include inorganic photoconductive compounds such as amorphous selenium, selenium alloys selected such as selenium-tellurium, selenium-tellurium-arsenic, and selenium arsenide and organic material such as chlorindium phthalocyanine, chloraluminum phthalocyanine, vanadyl phthalocyanine, and the like.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thickness outside these ranges can be selected providing the objectives of the present invention are achieved.

The active charge transport layer comprises a polymeric arylamine of this invention capable of supporting the injection of photogenerated holes from the charge generation layer and allowing the transport of these holes through the transport layer to selectively discharge the surface charge. When the photogenerating layer is sandwiched between the conductive layer and the active charge transport layer, the transport layer not only serves to transport holes, but also protects the photoconductive layer from abrasion or chemical attack and therefore extends the operating life of the electrophotographic imaging member. The charge transport layer should exhibit negligible, if any, discharge when exposed to a wavelength of light useful in xerography (e.g. 4000 angstroms to 9000 angstroms). Therefore, the charge transport layer is substantially transparent to radiation in a region in which the photoconductor is to be used. Thus, the active charge transport layer is a substantially non-photoconductive material which supports the injection of photogenerated holes from the generation layer. The active transport layer is normally transparent when exposure is effected through the active layer to ensure that most of the incident radiation is utilized by the underlying charge carrier generator layer for efficient photogeneration. When used with a transparent substrate, imagewise exposure may be accomplished through the substrate will all light passing through the substrate. In this case, the active transport material need not be transmitting in the wavelength region of use. The charge transport layer in conjunction with the generation layer in the instant invention is a material which is an insulator to the extent that an electrostatic charge placed on the transport layer is not conducted in the absence of illumination.

Part or all of the transport material comprising a hole transporting small molecule in an inactive binder to be employed in the transport layer may be replaced by the active materials of this invention described above comprising a polymeric arylamine film forming material. Any polymeric arylamine moieties should be free from electron withdrawing substituents such as $NO_2$ groups, CN groups, $>C=O$ and the like. The hole transporting small molecule-inactive resin binder composition may be entirely replaced with 100 percent of a polymeric arylamine compound of this invention.

Any suitable solvent may be employed to apply the transport layer material to the underlying layer. Typical solvents include methylene chloride, toluene, tetrahydrofuran, and the like. Toluene solvent is a particularly desirable component of the charge transport layer coating mixture for adequate dissolving of all the components.

Any suitable and conventional technique may be utilized to mix and thereafter apply the charge transport layer coating mixture to the underlying surface, e.g. charge generating layer. Typical applications techniques include spraying, dip coating, roll coating, wire wound rod coating, and the like. Drying of the deposited coating may be effected by any suitable conventional technique such as oven drying, infrared radiation drying, air drying and the like.

Generally, the thickness of the hole transport layer is between about 5 to about 100 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ration of the thickness of the hole transport layer to the charge generator layer is preferably maintained from about 2:1 to 200:1 and in some instances as great as 400:1.

Optionally, an electrically active overcoat layer may also be utilized to improve resistance to abrasion. In some cases a back coating may be applied to the side opposite the photoreceptor to provide flatness and/or abrasion resistance. These backcoating layers may comprise organic polymers or inorganic polymers that are electrically insulating or slightly semi-conductive.

The electrophotographic member of the present invention containing the electrically active polymeric arylamine as at least the generator or transport layer may be employed in any suitable and conventional electrophotographic imaging process which utilizes charging prior to image exposure to activating electromagnetic radiation. Conventional positive or reversal development techniques may be employed to form a marking material image on the imaging surface of the electrophotographic imaging member of this invention. Thus, by applying a suitable electrical bias and selecting toner having the appropriate polarity of electrical charge, one may form a toner image in the negatively charged areas or discharged areas on the imaging surface of the electrophotographic member of the present invention. More specifically, for positive development, charged toner particles of one polarity are attracted to the oppositely charged electrostatic areas of the imaging surface and for reversal development, charged toner particles are attracted to the discharged areas of the imaging surface. Where the transport layer of this invention is sandwiched between a photogenerating layer and a conductive surface, a positive polarity charge is normally applied prior to imagewise exposure to activating electromagnetic radiation. Where the photogenerating layer of this invention is sandwiched between a transport layer and a conductive surface, a negative polarity charge is normally applied prior to imagewise exposure to activating electromagnetic radiation.

The electrophotographic member of the present invention exhibits greater resistance to cracking, crazing, and will not crystallize or phase separate during cycling, when the polyarylamine compounds comprise 100% of the hole transport layer.

The invention will now be described in detail with respect to the specific preferred embodiments thereof, it being understood that these examples are intended to be illustrative only and that the invention is not intended to be limited to the materials, conditions, process parameters and the like recited herein. All parts and percentage are by weight unless otherwise indicated.

DETAILED DESCRIPTION OF PREFERRED EMBODIMENTS

The invention will now be described in detail with respect to the specific preferred embodiments thereof, it being understood that these examples are intended to be illustrative only and that the invention is not intended to be limited to the materials, conditions, process parameters and the like recited herein.

Preferred polymeric arylamines of this invention have a molecular weight from about 20,000 to 200,000 and more preferably from about 60,000 to 180,000. The most preferred weight is determined by the solubility of the polymer in solvents of choice for photoreceptors as well as the solution viscosity at a given weight.

Typical hydroxy tertiary arylamine compound useful in practicing the present invention include N,N'-diphenyl-N,N'-bis(3-hydroxyphenyl)-[1,1'-biphenyl]-4,4'-diamine; N,N-bis(4-(hydroxyphenyl)-m-toluidine; bis-N-(3-hydroxyphenyl)-N-phenyl-4-aminophenyl)-methane;

bis(N-(4-hydroxyphenyl)-N-phenyl)-4-aminophenyl]-isopropylidene; N,N'-diphenyl-N,N'-bis(3-hydroxyphenyl)[1,1''-terphenyl]-4,4''diamine; 9-ethyl-3.6-bis]N-phenyl-N-3(3-hydroxyphenyl)-aminocarbiazole; 1,4-bis(N-phenyl-N-(3-hydroxyphenyl)phenylenediamine; and the like. N,N'-diphenyl-N,N'-bis(3-hydroxyphenyl)-(1-1'-biphenyl)-4,4'-diamine is particularly preferred. Other arylamine compounds include those disclosed in U.S. Pat. Nos. 4,806,443, 4,806,444 and 4,818,650, the disclosures of which are incorporated herein by reference.

Representative hydroxy arylamine compounds may be prepared by hydrolyzing an alkoxy arylamine. A typical process for preparing alkoxy arylamines is disclosed in Example 1 of U.S. Pat. No. 4,588,666 to Stolka, et al., the entire disclosure of this patent being incorporated herein by reference. In accordance with the procedure of Example 1 in U.S. Pat. No. 4,588,666, N,N'diphenyl-N,N'-bis(3-hydroxyphenyl)-[1,1'-biphenyl]-4,4'-diamine may be synthesized from iodoanisole to achieve a yield of 90 percent, m.p. 120°–125° C. N,N'diphenyl-N,N'-bis(3-hydroxyphenyl)-[1,1'-biphenyl]-4,4'-diamine was prepared, for example from the N,N'-di(3-methoxyphenyl)-N,N'-diphenyl-[1,1-biphenyl]4,4'diamine by placing into a two liter three-necked round bottom flask, equipped with a mechanical stirrer and an argon gas inlet, 137.5 grams N.N'-diphenyl-N,N'-bis(3-methoxyphenyl)-[1,1'-biphenyl]-4,4'diamine (0.25 moles), 223.5 gms anhydrous sodium iodide (1.5 moles) and 500 milliliters warm sulfolane (distilled). The contents of the flask are heated to 120° C. then cooled to 60°–75° C. Five milliliters of D. I. water is added dropwise, followed by 190.5 milliliters of trimethyl-chlorosilane (1.5 moles). The contents are allowed to heat at 60° to 75° C. for six hours. HPLC analysis is utilized to determine when the reaction is complete. The contents of the flask is poured into a 3 liter Erlenmeyer flask containing 1.5 liter of deionized water. The water layer is decanted and the dark oily residue taken up into 500 milliliters methanol. The methanol solution is extracted with two 400 milliliter portions of hexane to remove the hexamethyldisiloxane by-products. The methanol solution was rotoevaporated to remove the solvents. The residue is taken up into 500 milliliters of acetone and then precipitated into 1.5 liters deionized water. The off-white solid is filtered and then washed with deionized water and dried in vacuo. The crude N,N'diphenyl-N,N'-bis(3-hydroxyphenyl)[1,1'-biphenyl]-4,4'-diamine is placed into a two liter round-bottom flask containing a magnetic stirrer and one liter toluene. Fifty gms. Florisil ® (Florisil is a registered trademark of Floridin Co.) is added to the flask and allowed to stir for two hours. The dark Florisil ® is filtered off, leaving a pale yellow toluene solution. The toluene is roto-evaporated to yield a pale yellow viscous oil. The oily product is dissolved in 400 milliliters acetone then diluted with 400 milliliters heptane and allowed to crystallize. The colorless crystals were filtered. Additional product is obtained by roto-evaporating the acetone from the filtrate.

Preferred silanes include dimethyldichlorosilane, diethyldichlorosilane, methylvinyl-dichlorosilane, 1,1,4,4-tetramethyl-1,4-dichlorodisilethylene, 1,2-dichlorotetramethyldisiloxane, methyltrichlorosilane, phenylmethyldichlorosilane, 1,7-dichlorooctamethyltetrasiloxane, 1,5-dichlorohexamethyltrisiloxane and the like.

An organic amine may be used in the reaction. Typical materials include amine halogen acceptors and pyridine is generally preferred.

EXAMPLE I

Transport Polymer Preparation Using N,N'-diphenyl-N,N'-bis(3-hydroxyphenyl)-(1-1'-biphenyl)-4,4'-diamine and Dimethyldichlorosilane The reaction vessel was constructed using a 500 ml. 3-necked Morton flask, a mechanical stirrer, a thermometer, a water condenser, a dropping burette and an electric heating mantle. The reaction vessel was charged with 10.4 grams of N,N'-diphenyl-N,N'-bis(3-hydroxyphenyl)-(1-1'-biphenyl)-4,4'-diamine (0.02 moles), 50 cc of dry toluene, and 5.0 grams of dry pyridine. The feed was comprised of 2.8 grams of $(CH_3)_2SiCl_2$ (0.022 moles) and 7 cc of dry toluene.

Using external heating and vigorous agitation, the kettle contents was heated to approximately 50° to 60° C. At 58° C. the feed was added slowly and dropwise over the span of approximately 10 minutes. No external heat was used after the addition of the feed because the exothermic reaction maintained the temperature at approximately 62° C. After addition of the feed was complete, the reaction mixture was heated externally for approximately 15 minutes at approximately 60° C.

When the contents of the reaction vessel reached 30° C., 100 cc of water and 100 cc of toluene were added and the mixture was stirred well. The contents of the reaction vessel were then transferred to a separatory funnel where the bottom water layer was removed. Then 100 cc of 2% $HCl/H_2O$ was added to the funnel and the contents were shaken well. The water layer was removed and the step was repeated. Then 100 cc of 2% $NaHCO_3/H_2O$ was added and the contents were stirred. The water layer was removed and the step was repeated. The contents were washed twice with 100 cc portions of $H_2O$. The solvent/polymer layer was then removed, dried with $Na_2SO_4$, and filtered. Yield = 10.0 grams.

EXAMPLE II

Transport Polymer Preparation Using N,N'-diphenyl-N,N'-bis(3-hydroxyphenyl)-(1-1'-biphenyl)-4,4'-diamine, Bis-Phenol A and Dimethyldichlorosilane The reaction vessel was constructed as in Example I. The reaction vessel was charged with 8.0 grams of dry Et$_3$N, 6.2 grams of N,N'-diphenyl-N,N'-bis(3-hydroxyphenyl)-(1-1'-biphenyl)-4,4'-diamine (0.012 moles), 50 cc of dry toluene, and 1.8 grams of bis-phenol A (about 0.008 moles). The feed was comprised of 2.8 grams of $(CH_3)_2SiCl_2$ (0.022 moles) and 7 cc of dry toluene.

Using external heating and vigorous agitation, the kettle contents was heated to approximately 60° C. At 55° C. the feed was added slowly and dropwise over the span of approximately 50 minutes. After addition of the feed was complete, the reaction mixture was heated externally for approximately 15 to 20 minutes at approximately 50° to 60° C. The contents were washed as in Example I to neutral pH. The contents were then dried over $Na_2SO_4$, and filtered.

The polymer solution obtained after filtration was recharged into the reaction vessel and 1.0 gram of $(CH_3)_2SiCl_2$ was added over the span of one hour. The contents were cooled and transferred to a separatory funnel where the contents were washed 3 times with 100 cc portions of H₂O, separated, dried over Na2SO4, and filtered. The filtered product was then precipitated into methanol and filtered. The solids were dried in a vacuum overnight at 50° C. Yield=5.5 grams.

EXAMPLE III

Transport Polymer Preparation Using
N,N'-diphenyl-N,N'-bis(3-hydroxyphenyl)-(1-1'-biphenyl)-4,4'-diamine and
1,5-Dichlorohexamethyltrisiloxane and Dimethyldichlorosilane The reaction vessel was constructed as in Example I. The reaction vessel was charged with 10.4 grams of N,N'-diphenyl-N,N'-bis(3-hydroxyphenyl)-(1-1'-biphenyl)-4,4'-diamine (0.02 moles), 50 cc of dry toluene, and 5.0 grams of dry pyridine. The first feed was comprised of 1.1 grams of 1,5 dichlorohexamethyltrisiloxane (about 0.004 moles) and 2.0 grams of dry toluene. The second feed was comprised of 2.3 grams (0.018 moles) of $Me_2SiCl_2$ and 7.0 grams of dry toluene.

Using external heating and vigorous agitation, the kettle contents were heated to approximately 75° C. At 75° C. the first feed was added slowly and dropwise over the span of approximately 10 minutes. After addition of the first feed was complete, the reaction mixture was heated externally for approximately 15 minutes at approximately 74° C. The reaction was then cooled to 60° C. and the second feed was added dropwise. After addition of the second feed was complete, the reaction mixture was heated externally for approximately 15 minutes at approximately 60° C. The reaction was cooled to room temperature where the contents were precipitated into 1500 ml of MeOH. A stringy elastomeric precipitate formed and was filtered through coarse glass frit. The filtrate was washed with MeOH and n-hexane. The solid was then dried at 45°-50° C. for 16 hours. The resulting solid was slightly turbid.

The dried solid was then resolvated in 75 cc of dry toluene. A celite filter aid was added and the solution was vacuum filtered through coarse glass frit. The filtrate was precipitated in 1500 ml n-heptane. The resulting polymer cake was washed with MeOH and vacuum dried for 3 hours at 50° C. The resulting solid was now transparent. Yield=9.5 grams. Mol. wt. data: $M_N=38,323$, $M_W=115,971$, disp. 3.03.

EXAMPLE IV

Transport Polymer Preparation Using
N,N'-diphenyl-N,N'-bis(3-hydroxyphenyl)-(1-1'-biphenyl)-4,4'-diamine, Bis-Phenol A,
1,5-Dichlorohexamethyltrisiloxane and Dimethyldichlorosilane The reaction vessel was constructed as in Example I. The reaction vessel was charged with 8.3 grams of N,N'-diphenyl-N,N'-bis(3-hydroxyphenyl)-(1-1'-biphenyl)-4,4'-diamine (0.016 moles), 0.9 grams of bis-phenol A (BPA) (0.004 moles), 50 cc of dry toluene, and 5.0 grams of dry pyridine. The first feed was comprised of 1.4 grams of 1,5-dichlorohexamethyltrisiloxane (about 0.005 moles) and 2.0 grams of dry toluene. The second feed was comprised of 2.2 grams of $Me_2SiCl_2$ (0.017 moles) and 7.0 grams of dry toluene.

Using external heating and vigorous agitation, the kettle contents were heated to approximately 75° C. At 75° C. the first feed was added slowly and dropwise over the span of approximately 10 minutes. After addition of the first feed was complete, the reaction mixture was heated externally for approximately 15 minutes at approximately 75° C. The reaction was then cooled to 65° C. and the second feed was added dropwise. After 20 minutes, the addition of the second feed was complete and the reaction mixture was heated externally for approximately 15 minutes at approximately 65° C. The reaction was cooled to room temperature where the contents were vacuum filtered through a coarse glass frit. The filtrate was precipitated into 1000 cc of heptane and stirred for 1 hour. The solution was then filtered through a coarse glass frit and the solid was vacuum dried at 50° C. for three hours. Yield=9.2 grams. Mol. wt. data: $M_N=21,339$, $M_W=45,140$, disp.=2.12.

EXAMPLE V

Transport Polymer Preparation Using
N,N'-diphenyl-N,N'-bis(3-hydroxyphenyl)-(1-1'-biphenyl)-4,4'-diamine, Dimethyldichlorosilane and Methyltrichlorosilane The reaction vessel was constructed as in Example I. The reaction vessel was charged with 10.4 grams of N,N'-diphenyl-N,N'-bis(3-hydroxyphenyl)-(1-1'-biphenyl)-4,4'-diamine (0.02 moles), 50 cc of dry toluene, and 5.0 grams of dry pyridine. The first feed was comprised of 2.8 grams of $Me_2SiCl_2$, and 7.0 grams of dry toluene. The second feed was comprised of 0.05 grams of $MeSiCl_3$ in 1.0 grams of dry toluene.

The kettle charge was stirred at room temperature until dissolved. The feed was added while stirring vigorously. After addition of the feed was complete, the reaction mixture rose to 34° C. because it was exothermic. The reaction mixture was then heated externally for approximately 30 minutes at approximately 50° C. The reaction was then cooled to room temperature. The solution was filtered through a coarse glass frit and returned to the kettle. While stirring the mixture at 25° C. 0.05 grams of $MeSiCl_3$ in 1.0 grams of toluene was added. After 15 minutes the reaction mixture was then heated externally for approximately 15 minutes at approximately 50° C. The reaction was then cooled to room temperature and the solution was filtered through a coarse glass frit. The solution was then stirred for 1 hour in 1500 cc of n-hexane, washed with MeOH, and filtered through a coarse glass frit. The remaining solid was vacuum dried at 60° C. for 16 hours. Yield=10.2 grams. Mol. wt. data: $M_N=53,866$, $M_W=239,958$, disp.=4.45.

EXAMPLE VI

Transport Polymer Preparation Using
N,N'-diphenyl-N,N'-bis(3-hydroxyphenyl)-(1-1'-biphenyl)-4,4'-diamine, Dimethyldichlorosilane and Methyltrichlorosilane The reaction vessel was constructed as in Example I. The reaction vessel was charged with 10.4 grams of N,N'-diphenyl-N,N'-bis(3-hydroxyphenyl)-(1-1'-biphenyl)-4,4'-diamine (0.02 moles), 50 cc of dry toluene, and 5.0 grams of dry pyridine. The feed was comprised of 2.7 grams of $Me_2SiCl_2$ (0.021 moles), 0.1 grams of $MeSiCl_3$ (0.0007 moles), and 8.0 grams of dry toluene.

Using external heating and vigorous agitation, the kettle contents were heated to approximately 50° to 60° C. At 50° C. the feed was added slowly and dropwise over the span of approximately 20 minutes. After addition of the feed was complete, the reaction mixture was heated externally for approximately 60 minutes at approximately 55° C. and was stirred vigorously.

The reaction was cooled to room temperature. The solution was filtered through a coarse glass frit and returned to the kettle. The solution was then stirred for 1 hour in 1500 cc of n-hexane, washed with MeOH, and filtered through a coarse glass frit. The remaining solid was vacuum dried at 50°–55° C. overnight. Yield=9.8 grams. Mol. wt. data: $M_N$=13,664, $M_W$=51,377, disp.=3.76.

EXAMPLE VII

Transport Polymer Preparation Using
N,N'-diphenyl-N,N'-bis(3-hydroxyphenyl)-(1-1'-biphenyl)-4,4'-diamine,
1,5-Dichlorohexamethyltrisiloxane and
Methyltrichlorosilane The reaction vessel was constructed as in Example I. The reaction vessel was charged with 10.4 grams of N,N'-diphenyl-N,N'-bis(3-hydroxyphenyl)-(1-1'-biphenyl)-4,4'-diamine (0.02 moles), 50 cc of dry toluene, and 5.0 grams of dry pyridine. The feed was comprised of 5.5 grams of 1,5-dichlorohexamethyltrisiloxane (0.02 moles) and 5.0 grams of dry toluene.

Using external heating and vigorous agitation, the kettle contents were heated to approximately 75° C. At 75° C. the feed was added slowly and dropwise over the span of approximately 35 minutes. After addition of the feed was complete, the reaction mixture was heated externally for approximately 60 minutes at approximately 70° C. and was stirred vigorously.

The reaction was then cooled to room temperature. At 25° C., 0.05 grams of MeSiCl$_3$ was added and heated to 50° C. After 15 minutes an additional 0.05 grams of MeSiCl$_3$ was added and heated at 50° C. for 15 minutes. The solution was cooled to room temperature, filtered through a coarse glass frit and precipitated in 1500 cc of methanol. The solution was vacuum filtered through a coarse glass frit. The remaining solid was vacuum dried at 50° C. for 3.0 hours. Yield=9.6 grams. Mol. wt. data: $M_N$=22,268, $M_W$=64,435, disp.=2.89.

EXAMPLE VIII

Transport Polymer Preparation Using
N,N'-diphenyl-N,N'-bis(3-hydroxyphenyl)-(1-1'-biphenyl)-4,4'-diamine and
1,7-Dichlorooctamethyltetrasiloxane The reaction vessel was constructed as in Example I. The reaction vessel was charged with 10.4 grams of N,N'-diphenyl-N,N'-bis(3-hydroxyphenyl)-(1-1'-biphenyl)-4,4'-diamine (0.02 moles), 50 cc of dry toluene, and 5.0 grams of dry pyridine. The feed was comprised of 7.0 grams of 1,7-dichlorooctamethyltetrasiloxane (0.02 moles) and 7.0 grams of dry toluene.

Using external heating and vigorous agitation, the kettle contents were heated to approximately 75° C. At 75° C. the feed was added slowly and dropwise over the span of approximately 35 minutes. The contents then were maintained at 75° C. for one hour. The reaction was then cooled to 50° C., and 0.1 grams of MeSiCl$_3$ in 1.0 gram of toluene was added and heated to 50°–55° C. and stirred for 15 minutes.

The contents were cooled to room temperature, filtered and precipitated into 1500 cc methanol. The precipitate was then vacuum overnight at 55° C. Yield=10.0 grams. Mol. wt. data: $M_N$=30,156, $M_W$=86,774, disp.=2.88.

EXAMPLE IX

Transport Polymer Preparation Using
N,N'-diphenyl-N,N'-bis(3-hydroxyphenyl)-(1-1'-biphenyl)-4,4'-diamine and
1,1,4,4-Tetramethyl-1,4-dichlorodisilethylene The reaction vessel was constructed as in Example I. The reaction vessel was charged with 10.4 grams of N,N'-diphenyl-N,N'-bis(3-hydroxyphenyl)-(1-1'-biphenyl)-4,4'-diamine (0.02 moles), 50 cc of dry toluene, and 5.0 grams of dry pyridine. The feed was comprised of 4.3 grams of 1,1,4,4-tetramethyl-1,4-dichlorodisilethylene (0.02 moles) and 7.0 grams of dry toluene.

Using external heating and vigorous agitation, the kettle contents were heated to approximately 75° C. At 75° C. the feed was added slowly and dropwise over the span of approximately 30 minutes. The contents then were maintained at 75° C. for one hour. The reaction was cooled to 50° C., and 0.1 grams of MeSiCl$_3$ in 1.0 gram of toluene was added and heated to 50°–55° C. and stirred for 15 minutes.

The contents were cooled to room temperature, filtered and precipitated into 1500 cc MeOH. The precipitate was then vacuum dried overnight at 55° C. Yield=11.5 grams. Mol. wt. data: $M_N$=6,723, $M_W$=30,139, disp.=4.48.

EXAMPLE X

Transport Polymer Preparation Using
N,N'-diphenyl-N,N'-bis(3-hydroxyphenyl)-(1-1'-biphenyl)-4,4'-diamine and
1,7-Dichlorooctamethyltetrasiloxane and
Phenylmethyldichlorosilane The reaction vessel was constructed as in example I. The reaction vessel was charged with 10.4 grams of N,N'-diphenyl-N,N'-bis(3-hydroxyphenyl)-(1-1'-biphenyl)-4,4'-diamine (0.02 moles), 50 cc of dry toluene, and 5.0 grams of dry pyridine. The feed was comprised of 5.6 grams of 1,7-dichlorooctamethyltetrasiloxane (0.016 moles), 0.8 grams of phenylmethyldichlorosilane (0.004 moles) and 7.0 grams of dry toluene.

Using external heating and vigorous agitation, the kettle contents were heated to approximately 75° C. At 75° C. the feed was added slowly and dropwise over the span of approximately 40 minutes. The contents then were maintained at 75° C. for one hour. The reaction was then cooled to about 50°–55° C. At 55° C., 0.1 grams of MeSiCl$_3$ in 1.0 grams of toluene was added and heated to 50°–55° C. and stirred for 15 minutes.

The contents were cooled to room temperature, filtered through a coarse glass frit and precipitated into 1500 cc MeOH. The precipitate was then vacuum dried overnight at 50° C. Yield=13.2 grams.

EXAMPLE XI

Transport Polymer Preparation Using
N,N'-diphenyl-N,N'-bis(3-hydroxyphenyl)-(1-1'-biphenyl)-4,4'-diamine and
1,7-Dichlorooctamethyltetrasiloxane and
Dimethyldichlorosilane The reaction vessel was constructed as in Example I. The reaction vessel was charged with 10.4 grams of N,N'-diphenyl-N,N'-bis(3-hydroxyphenyl)-(1,1'-biphenyl)-4,4'-diamine (0.02 moles), 50 cc of dry toluene, and 5.0 grams of dry pyridine. The first feed was comprised of 3.5 grams of 1,7-dichlorooctamethyltetrasiloxane (about 0.01 moles) and 7.0 grams of dry toluene. The second feed was comprised of 1.6 grams of dimethyldichlorosilane (0.012 moles) and 3.0 grams of dry toluene.

Using external heating and vigorous agitation, the kettle contents were heated to approximately 75° C. At 75° C. the first feed was added slowly and dropwise over the span of approximately 20 minutes. The contents then were maintained at 75° C. for 20 minutes. The reaction was then cooled to 50° C. At 50° C. the second feed was added slowly and dropwise over the span of approximately 10 minutes. The contents then were maintained at 50° C. for 15 minutes. The contents were cooled to room temperature, filtered through #2 Whatman paper, and precipitated into 1500 cc MeOH. The precipitate was then vacuum dried at 50° C. for three hours. Yield = 10.6 grams. Mol. wt. data: $M_N$ = 23,988, $M_W$ = 64,439, disp. = 2.69.

EXAMPLE XII

Transport Polymer Preparation Using
N,N'-diphenyl-N,N'-bis(3-hydroxyphenyl)-(1-1'-biphenyl)-4,4'-diamine and
1,7-Dichlorooctamethyltetrasiloxane and Dimethyldichlorosilane The reaction vessel was constructed as in Example I. The reaction vessel was charged with 10.4 grams of N,N'-diphenyl-N,N'-bis(3-hydroxyphenyl)-(1-1'-biphenyl)-4,4'-diamine (0.02 moles), 50 cc of dry toluene, and 5.0 grams of dry pyridine. The first feed was comprised of 3.5 grams of 1,7-dichlorooctamethyltetrasiloxane (0.01 moles) and 7.0 grams of dry toluene. The second feed was comprised of 1.8 grams of dimethyldichlorosilane (0.014 moles) and 3.0 grams of dry toluene.

Using external heating and vigorous agitation, the kettle contents were heated to approximately 75° C. At 75° C. the first feed was added slowly and dropwise over the span of approximately 25 minutes. The contents then were maintained at 75° C. for 15 minutes. The reaction was then cooled to 50° C. At 50° C. the second feed was added slowly and dropwise over the span of approximately 20 minutes. The contents were maintained at 50° C. for 15 minutes.

The contents were cooled to room temperature, filtered through #2 Whatman paper, and precipitated into 1500 cc MeOH. The precipitate solution was stirred for one hour and then filtered through a coarse glass frit. The polymer cake was washed with MeOH several times. The polymer cake was then vacuum dried at 50° C. for 16 hours. Yield = 12.3 grams. Mol. wt. data: $M_N$ = 34,482, $M_W$ = 78,131, disp. = 2.27.

We claim:

1. An electrophotographic imaging member having a hole transport layer and a charge generating layer, wherein at least one of the hole transport layer and the charge generating layer comprises a polymer of the formula:

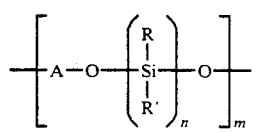

wherein A is a tertiary arylamine moiety, R is a substituted or unsubstituted alkyl, alkenyl or aryl group, R' is a substituted or unsubstituted alkyl, alkenyl or aryl group, m is an integer from about 5 to about 5,000, and n is an integer from 1 to 6.

2. The imaging member of claim 1 wherein said tertiary arylamine moiety is derived from a compound selected from the group consisting of N,N'-diphenyl-N,N'-bis(3-hydroxyphenyl)-[1,1'-biphenyl]-4,4'diamine; N,N-bis(4-hydroxyphenyl)-m-toluidine; bis-N-(3-hydroxyphenyl)-N-phenyl-4-aminophenyl)-methane; bis(N-(4-hydroxyphenyl)-N-phenyl)-4-aminophenyl]-isopropylidene; N,N'-diphenyl-N,N'-bis(3-hydroxyphenyl)[1,1''-terphenyl]-4,4''-diamine; 9-ethyl-3,6-bis[N-phenyl-N-3(3-hydroxyphenyl)-aminocarbiazole; and 1,4-bis(N-phenyl-N-(3-hydroxyphenyl)-phenylenediamine.

3. The imaging member of claim 2 wherein said compound is N,N'-diphenyl-N,N'-bis(3-hydroxyphenyl)-(1,1'-biphenyl)-4,4'-diamine.

4. The imaging member of claim 1 wherein R and R' are each methyl or ethyl.

5. The imaging member of claim 4 wherein n is from 1 to 4.

6. The imaging member of claim 5 wherein n is 1.

7. An electrophotographic imaging member having a hole transport layer and a charge generating layer, wherein at least one of the hole transport layer and the charge generating layer comprises a polymer formed by the reaction of a tertiary arylamine with one or more silanes of the formula:

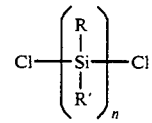

wherein R is a substituted or unsubstituted alkyl, alkenyl or aryl group, R' is a substituted or unsubstituted alkyl, alkenyl or aryl group, m is an integer from about 5 to about 5,000, and n is an integer from 1 to 6.

8. The imaging member of claim 7 wherein said tertiary arylamine is selected from the group consisting of N,N'-diphenyl-N,N'-bis(3-hydroxyphenyl)-[1,1'-biphenyl]-4,4'diamine; N,N-bis(4-hydroxyphenyl)-m-toluidine; bis-N-(3-hydroxyphenyl)-N-phenyl-4-aminophenyl)-methane; bis(N-(4-hydroxyphenyl)-N-phenyl)-4-aminophenyl]-isopropylidene; N,N'-diphenyl-N,N'-bis(3-hydroxyphenyl)[1,1''-terphenyl]-4,4''diamine; 9-ethyl-3,6-bis[N-phenyl-N-3(3-hydroxyphenyl)-aminocarbiazole; and 1,4-bis(N-phenyl-N-(3-hydroxyphenyl)phenylenediamine.

9. The imaging member of claim 8 wherein said tertiary arylamine is N,N'-diphenyl-N,N'-bis(3-hydroxyphenyl)-(1-1'-biphenyl)-4,4'-diamine.

10. The imaging member of claim 7, wherein said silane is selected from the group consisting of dimethyldichlorosilane, diethyldichlorosilane, methylvinyldichlorosilane, methyltrichlorosilane, and phenylmethyldichlorosilane.

11. The imaging member of claim 10 wherein said silane is dimethyldichlorosilane.

12. The imaging member of claim 7 wherein said tertiary arylamine and said silane are reacted in the presence of an additional aryl monomer.

13. The imaging member of claim 12 wherein said additional monomer is bisphenol A.

14. An electrophotographic imaging member having a hole transport layer and a charge generating layer, wherein at least one of the hole transport layer and the charge generating layer comprises a polymer formed by the reaction of a tertiary arylamine with 1, 1, 4, 4-tetramethyl-1, 4-dichlorodisilethylene.

15. An electrophotographic imaging member having a hole transport layer and a charge generating layer, wherein at least one of the hole transport layer and the charge generating layer comprises a polymer formed by the reaction of a tertiary arylamine with one or more siloxanes selected from the group consisting of 1, 2-dichlorotetramethyldisiloxane, 1, 7-dichlorooctamethyltetrasiloxane, and 1, 5-dichlorohexamethyltrisiloxane.

16. The imaging member of claim 1 wherein the hole transport layer comprises a polymer of said formula.

17. The imaging member of claim 7 wherein the hole transport layer comprises a polymer of said formula.

18. The imaging member of claim 16 wherein the charge generating layer comprises a polymer of said formula.

19. The imaging member of claim 17 wherein the charge generating layer comprises a polymer of said formula.

20. The imaging member of claim 1 wherein the charge generating layer comprises a polymer of said formula.

21. The imaging member of claim 7 wherein the charge generating layer comprises a polymer of said formula.

* * * * *

UNITED STATES PATENT AND TRADEMARK OFFICE
CERTIFICATE OF CORRECTION

PATENT NO. : 5,230,976
DATED : July 27, 1993
INVENTOR(S) : Richard L. Schank, et al It is certified that error appears in the above-indentified patent and that said Letters Patent is hereby corrected as shown below:

Column 5, line 65, change "ration" to --ratio--
Column 7, line 3, change "-bis]N-" to ---bis[N---
Column 7, line 45, change "rotoevaporated" to --roto-evaporated--
Column 15, line 6, change "4-ter-" to --4-te---

Signed and Sealed this

Fifth Day of April, 1994

Attest:

BRUCE LEHMAN

Attesting Officer

Commissioner of Patents and Trademarks